(12) United States Patent
Lee et al.

(10) Patent No.: US 8,559,524 B2
(45) Date of Patent: Oct. 15, 2013

(54) VIDEO DECODING APPARATUS AND METHOD BASED ON A DATA AND FUNCTION SPLITTING SCHEME

(75) Inventors: Jae Jin Lee, Daejeon (KR); Moo Kyoung Chung, Daejeon (KR); Kyung Su Kim, Seoul (KR); Jun Young Lee, Busan (KR); Seong Mo Park, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 651 days.

(21) Appl. No.: 12/837,022

(22) Filed: Jul. 15, 2010

(65) Prior Publication Data

US 2011/0116550 A1 May 19, 2011

(30) Foreign Application Priority Data

Nov. 19, 2009 (KR) ........................ 10-2009-0111879

(51) Int. Cl.
*H04N 7/26* (2006.01)

(52) U.S. Cl.
USPC .................................................. 375/240.25

(58) Field of Classification Search
USPC ............... 375/240.25; 382/234, 304; 711/130
See application file for complete search history.

(56) References Cited

U.S. PATENT DOCUMENTS

| 2001/0041012 A1* | 11/2001 | Hsieh et al. ................... 382/234 |
| 2007/0253491 A1* | 11/2007 | Ito et al. ..................... 375/240.24 |
| 2008/0031329 A1* | 2/2008 | Iwata et al. ............. 375/240.12 |
| 2008/0074426 A1* | 3/2008 | Stein et al. ..................... 345/502 |
| 2008/0215817 A1* | 9/2008 | Nonogaki et al. ............ 711/130 |
| 2009/0049281 A1* | 2/2009 | Kim et al. ..................... 712/220 |

FOREIGN PATENT DOCUMENTS

KR 2009-0010860 A 1/2009

OTHER PUBLICATIONS

Shuou Nomuar et al., "A 9.7mW AAC-Decoding, 620mW H.264 720p 60fps Decoding, 8-Core Media Processor with Embedded Forward-Body-Biasing and Power-Gating Circuit in 65nm CMOS Technology", 2008 IEEE International Solid-State Circuits Conference, Session 13, 2008, pp. 262~263, 612.
F. H. Seitner, et. al.; "Evaluation of data-parallel splitting approaches for H.264 decoding"; Proc. 6th Int. Conf. on Advances in Mobile Computing & Multimedia; Linz, Austria; Nov. 24-26 2008; pp. 40-49.
Michael A. Baker, et al.; "A Scalable Parallel H.264 Decoder on the Cell Broadband Engine Architecture"; Proceedings of International Conference on Hardware-Software Codesign and System Synthesis (CODES-ISSS); Grenoble, France; Oct. 11-16 2009; pp. 353-362.

* cited by examiner

*Primary Examiner* — Mehrdad Dastouri
*Assistant Examiner* — Mohammed Rahaman
(74) *Attorney, Agent, or Firm* — Rabin & Berdo, P.C.

(57) ABSTRACT

A video decoding apparatus and method based on a data and function splitting scheme are disclosed. The video decoding apparatus based on a data and function splitting scheme includes a variable length decoding unit performing variable length decoding and parsing on a bit stream to acquire residual data and a decoding parameter, and splitting the residual data and the decoding parameter by row; and N (N is a natural number of 2 or larger) number of clusters splitting dequantization and inverse discrete cosine transform (IDCT), motion vector prediction, intra prediction and motion compensation, video restoration, and deblocking function into M number of functions, acquiring the residual data, the decoding parameter, and macroblock (MB) processing information of an upper cluster by column, and splitting the information acquired by column into M number of functions to process the same.

11 Claims, 5 Drawing Sheets

(a)

(b)

VIDEO DECODING APPARATUS AND METHOD BASED ON A DATA AND FUNCTION SPLITTING SCHEME

CROSS-REFERENCE TO RELATED APPLICATIONS

This application claims the priority of Korean Patent Application No. 10-2009-111879 filed on Nov. 19, 2009, in the Korean Intellectual Property Office, the disclosure of which is incorporated herein by reference.

BACKGROUND OF THE INVENTION

1. Field of the Invention

The present invention relates to a video decoding technique and, more particularly, to a video decoding apparatus and method based on a data and function splitting scheme capable of maximizing parallel processing operational characteristics and efficiency of a decoding operation.

2. Description of the Prior art

A video compression/restoration technique requisite for multimedia is implemented by new video compression standards such as H.264/AVC, VC-1, AVS, and the like, having a very high compression rate and allowing for reliable transmission, as well as MPEG currently used for HDTV broadcasting.

In particular, as these video compression standards are combined with next-generation services such as digital data broadcasting, next-generation mobile phones, IPTV, satellite DMB, and the like, their applications are anticipated.

The video compression technique has been developed for the purpose of minimizing bandwidth use by reducing bit size while maintaining restored screen image picture quality as high as that of the original.

Compared with existing video compression standards such as MPEG-2, the new video compression standards have an algorithm with remarkably increased complexity and request a large amount of calculation, which thus requires dedicated hardware or a device for real time compression/restoration.

Recent video compression standards involve the interdependence of data in a single screen image (i.e., intra-screen data) as well as interdependence of data between screen images (i.e., inter-screen data), making it difficult to implement the parallel processing of a video decoding system, and an optimum solution to this has yet to be proposed.

The prior art splitting scheme for parallel-processing includes a data splitting scheme in which data itself processed in resource is split and a function splitting scheme in which a function module is split in a pipeline manner and processed.

FIG. 1 illustrates a multiprocessor-based video decoding apparatus employing the data splitting scheme according to the prior art.

As shown in FIG. 1, in the data splitting scheme, an input stream is split into a plurality of data fragments 111 to 116 according to a certain level (e.g., frame, slide, a macroblock row, macroblock (16×16), block (4× pixel)), and each of the split data is parallel-processed by different processors 121 to 123.

The data splitting scheme illustrated in FIG. 1 can make data (streams) highly parallel, provided the split data have no interdependence therebetween, but is ineffective for a multimedia application which has intra-screen or inter-screen data dependency.

FIG. 2 illustrates a multiprocessor-based video decoding apparatus employing the function splitting scheme according to the prior art.

As shown in FIG. 2, in the function splitting scheme, a decoding function is split into a plurality of functions 211 to 216, and the split functions are parallel-processed by different processors 221 to 226.

However, the function splitting scheme illustrated in FIG. 2 is based on a pipeline processing structure, so if a processing time between processors is different, resource use efficiency is thereby degraded, which thus requires the additional performance of a process of uniformly splitting the function.

SUMMARY OF THE INVENTION

An aspect of the present invention provides a video decoding apparatus and method based on a data and function splitting scheme capable of splitting a bit stream by data (in the unit of data) and then splitting the split data by function (in the unit of function) to process the same, regardless of data dependency, thereby maximizing parallel processing characteristics and the utilization of a decoding operation.

Another aspect of the present invention provides a video decoding apparatus and method based on a data and function splitting scheme capable of stably implementing a video decoding system with limited communication resources by preventing an increase in communication overhead due to a parallel operation.

According to an aspect of the present invention, there is provided a video decoding apparatus based on a data and function splitting scheme, including: a variable length decoding unit performing variable length decoding and parsing on a bit stream to acquire residual data and a decoding parameter, and splitting the residual data and the decoding parameter by row; and N (N is a natural number of 2 or larger) number of clusters splitting a decoding function into M (M is a natural number of 2 or larger) number of functions, acquiring the residual data, the decoding parameter, and macroblock (MB) processing information of an upper cluster by column, and splitting the information acquired by column into M number of functions to process the same.

Each of the N number of clusters may include: M number of resources splitting dequantization and inverse discrete cosine transform (IDCT), motion vector prediction, intra prediction and motion compensation, video restoration, and deblocking function, constituting the decoding function, into M number of functions to process them; and (M−1) number of resource shared memories shared by neighboring resources to support inter-resource data communication.

The video decoding apparatus may further include: N number of data memories supporting data communication between the variable length decoding unit and the N number of clusters; and N number of cluster shared memories shared by neighboring clusters to support data communication between clusters.

The number of data memories, the clusters, the cluster shared memories, the resources, and the resource shared memories may be determined in consideration of the decoding size and performance of the subject video.

Each of the N number of clusters may receive the MB processing information of the upper cluster through the cluster shared memory shared by each individual cluster and the upper cluster, and MB processing information of each cluster is stored in a cluster shared memory shared by each individual cluster and a lower cluster.

The MB processing information of the upper cluster may include X coordinate and decoded information of decoded MBs decoded by the upper cluster among neighboring clusters.

Each of the N number of clusters may have a function of checking inter-data dependency through the X coordinate and waiting for an operation until such time as inter-data dependency is satisfied.

The video decoding apparatus may further include: a frame memory storing decoding-completed data provided from each of the N number of clusters.

The resource may be a hardware IP or a processor core.

According to another aspect of the present invention, there is provided a video decoding method, based on a data and function splitting scheme, using N (N is a natural number of 2 or larger) number of clusters including M number resources that split a decoding function into M (M is a natural number of 2 or larger) number of decoding functions and parallel-process the same, including: acquiring residual data and a decoding parameter from a bit stream and splitting the residual data and the decoding parameter by row; acquiring, by each of the N number of clusters, the residual data, the decoding parameter, and macroblock (MB) processing information of an upper cluster by row; and splitting, by each of the N number of clusters, a decoding operation with respect to the residual data, the decoding parameter and the MB processing information of the upper cluster into M number of functions through the M number of resources, and parallel-processing the same.

The MB processing information of the upper cluster may include an X coordinate and decoded information of MBs decoded by the upper cluster among neighboring clusters.

The acquiring of the residual data and decoding parameter by row may include: checking, by each of the N number of clusters, an intra-data dependency through the X coordinate included in the MB processing information stored in cluster shared memories shared by each individual cluster and an upper cluster; when intra-data dependency is satisfied, acquiring, by each of the N number of clusters, residual data and a decoding parameter stored in the data memories connected to each individual cluster by row; and acquiring, by each of the N number of clusters, the decoded information included in the MB processing information stored in the cluster shared memories shared by each individual cluster with an upper cluster by row.

The splitting of M number of resources into M number of functions and parallel-processing the same may include: splitting, by each of the N number of clusters, the residual data, the decoding parameter, and the decoding operation on the MB processing information of the upper cluster through the M number of resources; collecting, by each of the N number of clusters, the MB processing information through the M number of resources and storing the collected MB processing information in cluster shared memories shared by each individual cluster with a lower cluster; and when the decoding operation of each of the N number of clusters is completed, collecting decoding-completed data through the M number of resources and delivering the collected decoding-completed data to a frame memory.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
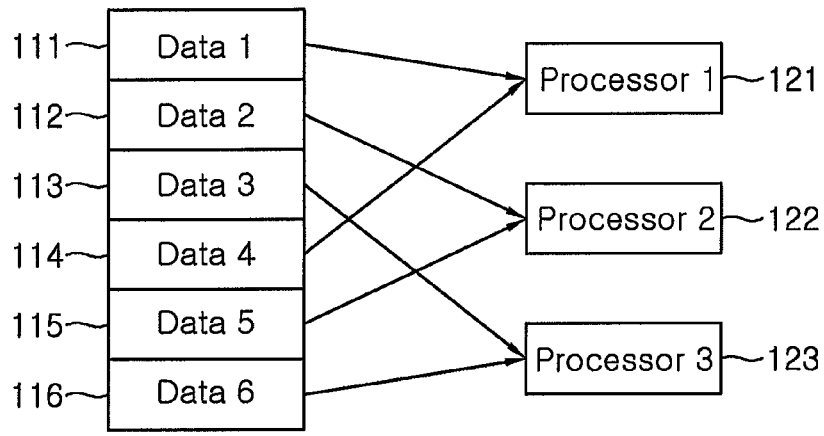
FIG. 1 illustrates a video decoding apparatus employing a data splitting scheme according to the prior art.
Figure 2:
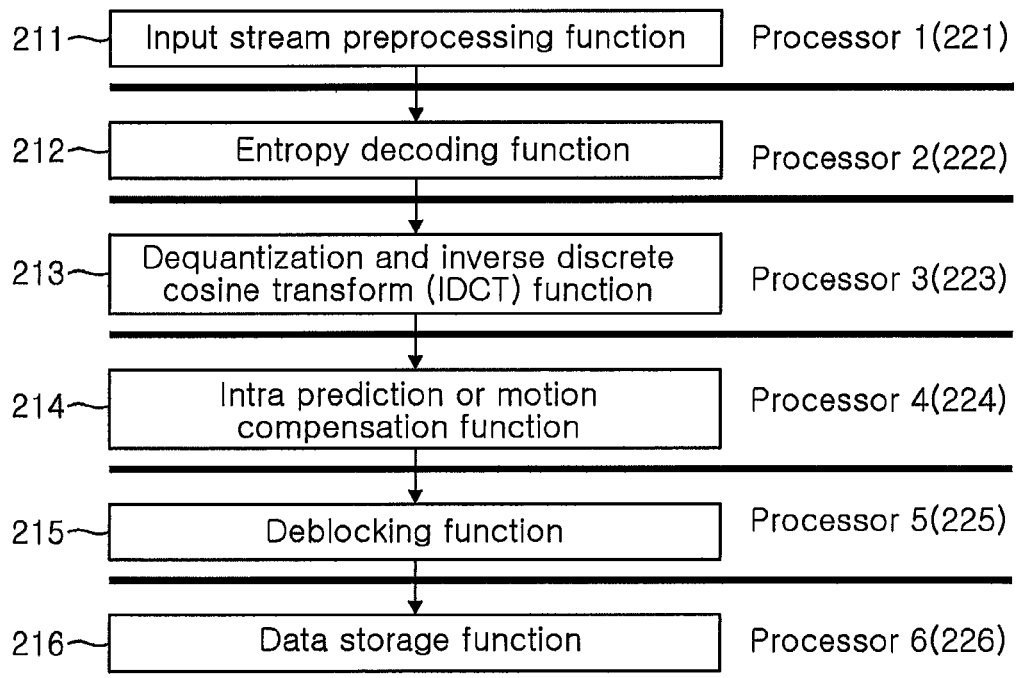
FIG. 2 illustrates a video decoding apparatus employing a function splitting scheme according to the prior art.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In describing the present invention, if a detailed explanation for a related known function or construction is considered to unnecessarily divert the gist of the present invention, such explanation will be omitted but would be understood by those skilled in the art. In the drawings, the shapes and dimensions may be exaggerated for clarity, and the same reference numerals will be used throughout to designate the same or like components.

Unless explicitly described to the contrary, the word "comprise" and variations such as "comprises" or "comprising," will be understood to imply the inclusion of stated elements but not the exclusion of any other elements.

Before describing a video decoding apparatus and method according to the present invention, the interdependency of data generated during a video decoding operation will first be described to help understand the present invention as follows.

Figure 3:
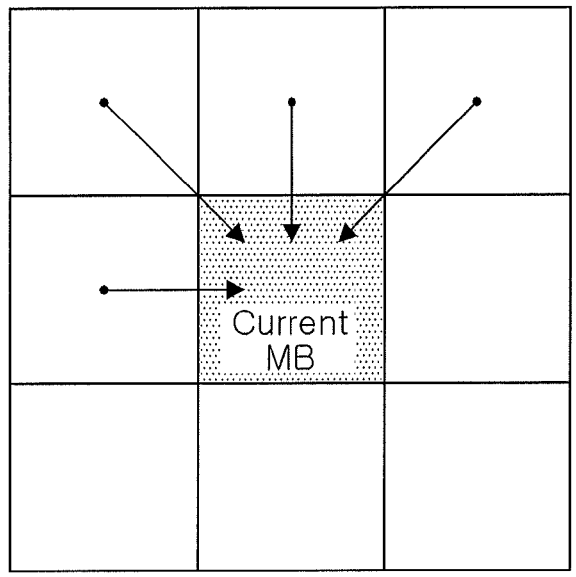
FIG. 3 is a view for explaining a data dependency of a video compression standard.
Figure 3:
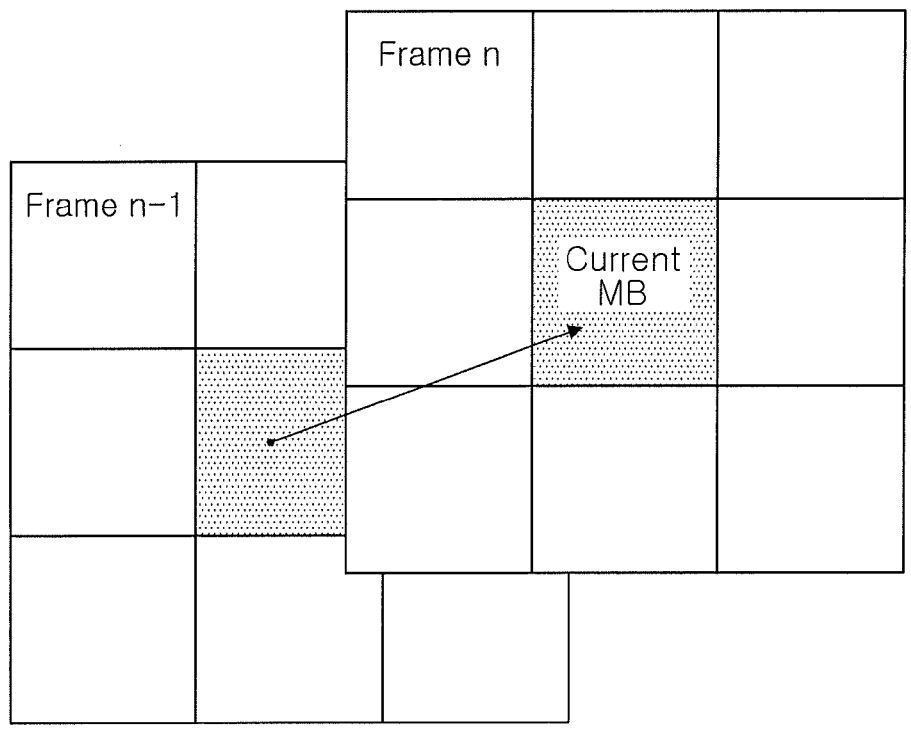

FIG. 3 is a view for explaining a data dependency of a general video compression standard. In FIG. 3, (a) shows intra-screen data dependency, and (b) shows inter-screen data dependency.

First, as shown in FIG. 3(*a*), in order to perform an intra-screen prediction, decoded information (e.g., intra and motion vector prediction values) of neighboring macroblocks (MBs) with respect to a current MB is necessary.

In addition, in order to perform inter-screen prediction, as shown in FIG. 3(*b*), the motion vector information of a previous frame is requisite.

Thus, the present invention proposes a video decoding apparatus and method with a new structure capable of parallel-processing a bit stream according to a data and function splitting scheme, regardless of intra-screen data dependency.

Figure 4:
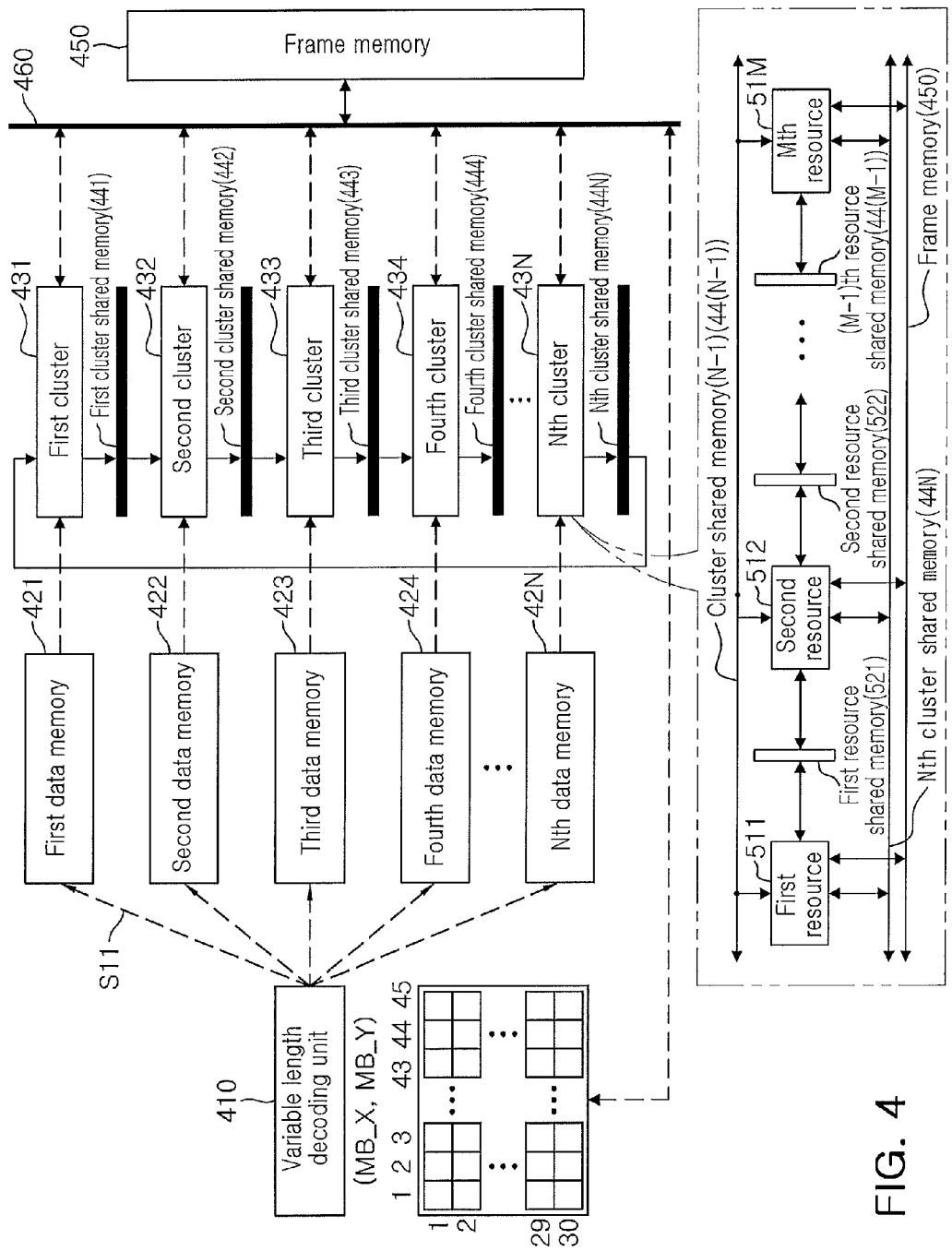
FIG. 4 is a schematic block diagram of a video decoding apparatus based on a data and function splitting scheme according to an exemplary embodiment of the present invention.

FIG. 4 is a schematic block diagram of a video decoding apparatus based on a data and function splitting scheme according to an exemplary embodiment of the present invention.

With reference to FIG. 4, the video decoding apparatus includes N (N is a natural number of 2 or larger) number of data memories 421 to 42N, N number of clusters 431 to 43N corresponding to the data memories 421 to 42N, respectively, N number of cluster shared memories 441 to 44N shared by neighboring clusters, and a frame memory 450 connected to the N number of clusters 431 to 43N via a bus 460. Each of the N number of clusters 431 to 43N includes M (M is a natural number of 2 or larger) number of resources 511 to 51M and (M−1) number of resource shared memories 521 to 52(M−1) shared by neighboring resources.

In an exemplary embodiment of the present invention, resource refers to every kind of device, such as a hardware IP or a processor core, that can perform a particular function, and the number of the data memories, the clusters, the cluster shared memories, the resources, and the resource shared memories may be determined in consideration of a decoding size and performance of video.

The cluster shared memories and the resource shared memories have a locality shared only by neighboring clusters and neighboring resources.

The function of each element will now be described.

The variable length decoding unit 410 performs variable length decoding (VLD) and parsing on an input bit stream, restores residual data with a variable length, acquires a decoding parameter (e.g., a quantization parameter, a skip counter, a screen size, a coding bit rate, etc.), splits them by row, and parallel-stores the split data in N number of data memories 421 to 42N.

Also, the variable length decoding unit 410 parallel-stores residual data and decoding parameters of new rows in the N number of data memories 421 to 42N before the decoding operation of the N number of clusters 431 to 43N is completed, in order to allow the N number of clusters 431 to 43N to continuously perform decoding operation.

Each of the N number of data memories 421 to 42N parallel-store the residual data and decoding parameter which have been split by row by the variable length decoding unit 410.

Each of the N number of cluster shared memories 441 to 44N are shared by neighboring clusters, stores macroblock (MB) processing information of an upper cluster among the neighboring clusters, and provides the stored MB processing information to a lower cluster among the neighboring clusters. Namely, the N number of cluster shared memories 441 to 44N support data communication between clusters.

In this case, the MB processing information of the upper cluster includes an X coordinate and decoded information (e.g., intra and motion vector prediction values, etc.) of the MBs decoded by the upper cluster.

Each of the N number of clusters 431 to 43N includes M number of resources splitting a decoding function, such as dequantization and inverse discrete cosine transform (IDCT), motion vector prediction, intra prediction and motion compensation, video restoration, and deblocking function, into M number of functions to process them; and (M−1) number of resource shared memories shared by neighboring resources to support inter-resource data communication. When a decoding operation is activated, each of the clusters 431 to 43N checks whether or not an intra-screen data dependency is satisfied by using the X coordinate stored in the cluster shared memories 44N to 44(N−1) shared by each individual cluster and upper clusters 43N to 43(N−1). The clusters 431 to 43N wait until such time as the inter-data dependency is satisfied, and then when the inter-screen data dependency is satisfied, the clusters 431 to 43N read the residual data and decoding parameter stored in the data memories 421 to 42N connected with the clusters 431 to 43N and the decoded information stored in the cluster shared memories 441 to 44N shared by each individual cluster and an upper cluster by row. And then, the clusters 431 to 43N parallel-process the decoding operation with respect to the read information through M number of resources 511 to 51M, and when the decoding operation is completed, the clusters 431 to 43N store the decoding-completed data in the frame memory 450.

Namely, in an exemplary embodiment of the present invention, the N number of clusters 431 to 43N receive information for canceling off intra-screen data dependency through the cluster shared memories 441 to 44N and process the residual data by splitting it by data (in the unit of data), and also split the residual data, which has been split by data through the M number of resources 511 to 51M, by function to process the same.

Also, each of the N number of clusters 431 to 43N stores each individual MB processing information in the cluster shared memories 441 to 44N shared by each individual cluster and lower clusters 432 to 431, and the lower clusters 432 to 431 also acquire data required for decoding by row and split the data into M number of functions so as to be processed.

The frame memory 450 performs data communication with the plurality of clusters 431 to 43N via the bus 460, and stores the decoding-completed data provided from each of the plurality of clusters 431 to 43N. In this case, the decoding-completed data is used as reference data for a deblocking image or motion compensation of MBs later.

As described above, in an exemplary embodiment of the present invention, the bit stream is split by data, which is then split by function so as to be processed. Thus, the parallel characteristics and utilization of the decoding operation can be maximized.

Also, because data communication between clusters and resources is performed through the cluster shared memories and the resource shared memories, an increase in the usage amount of the bus due to the parallel operation can be prevented in advance.

Figure 5:
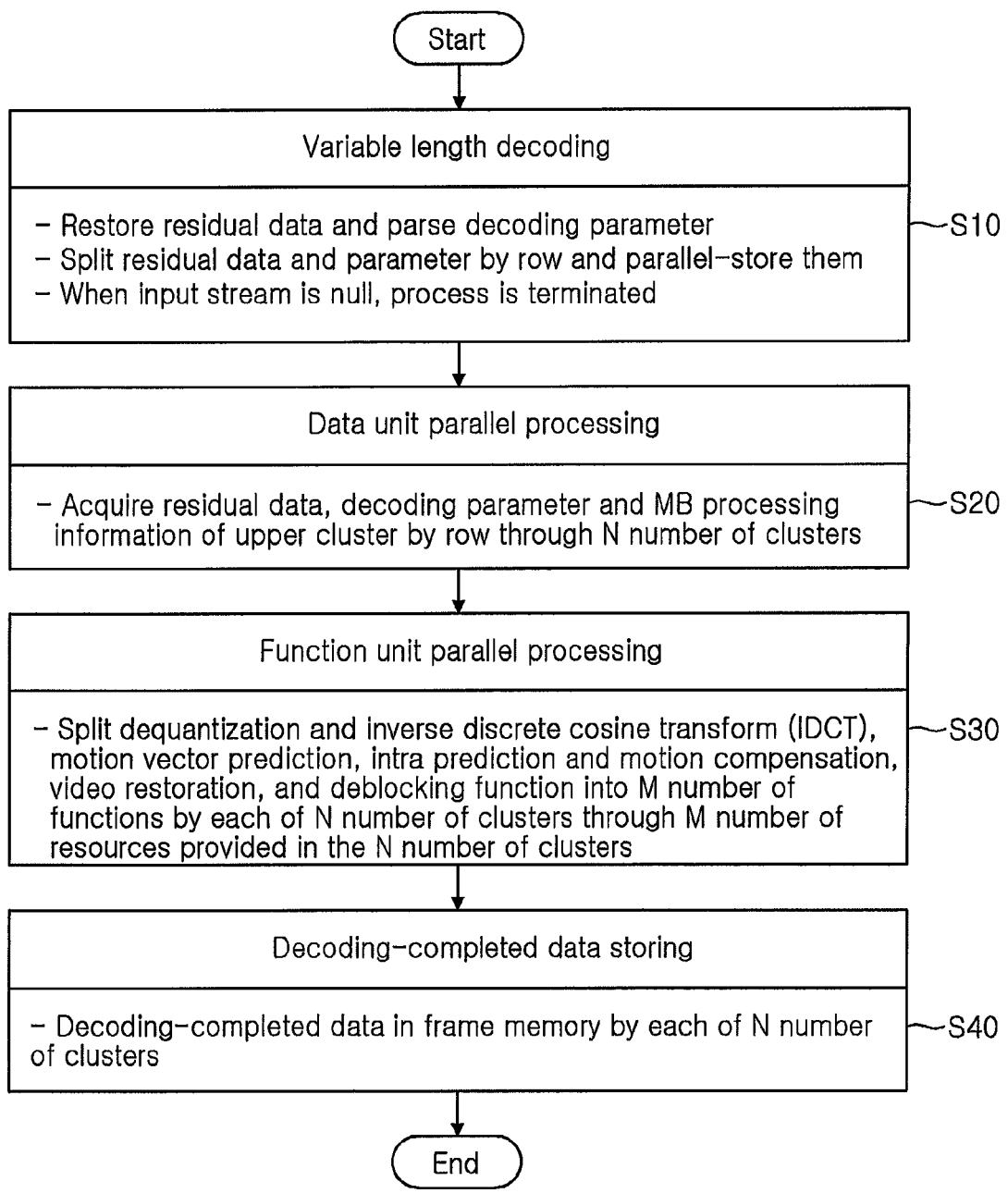
FIG. 5 is a flow chart illustrating the process of a video decoding method based on a data and function splitting scheme according to an exemplary embodiment of the present invention.
Figure 6:
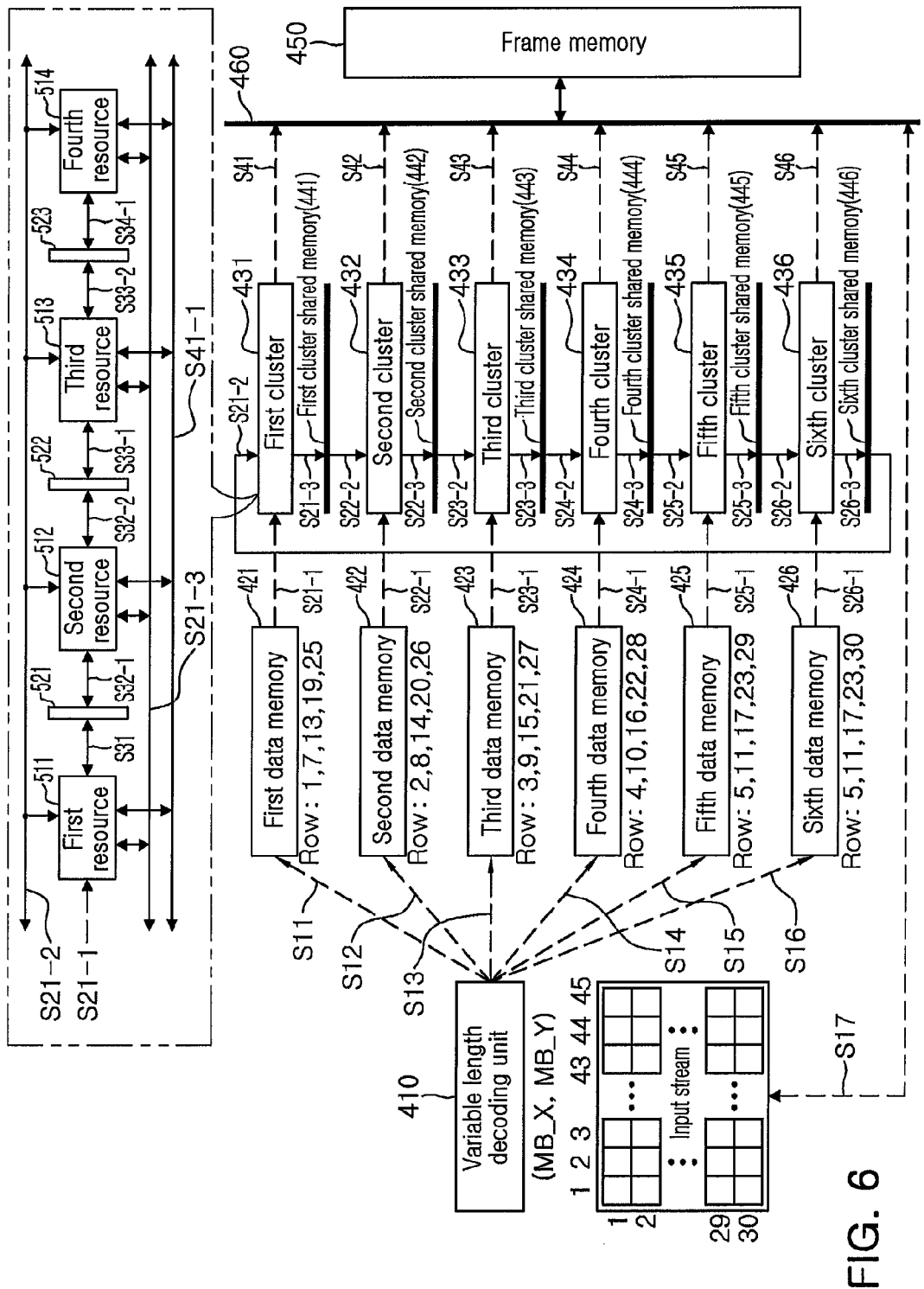
FIG. 6 is a view for explaining in detail the video decoding method based on a data and function splitting scheme according to an exemplary embodiment of the present invention.

FIGS. 5 and 6 are views for explaining the video decoding method based on the data and function splitting scheme according to an exemplary embodiment of the present invention.

As shown in FIG. 5, the video decoding method based on the data and function splitting scheme according to an exemplary embodiment of the present invention includes a variable length decoding step (S10) of restoring residual data from a bit stream, parsing the decoding parameter, splitting the residual data and the decoding parameter by row, and storing the same; a data unit parallel processing step (S20) of acquiring the residual data, the decoding parameter, and macroblock (MB) processing information of an upper cluster by row through each of the N number of clusters; a function unit parallel processing step (S30) of splitting dequantization and inverse discrete cosine transform (IDCT), motion vector prediction, intra prediction and motion compensation, video restoration, and deblocking function into M number of functions through the M number of resources provided in each of the N number of clusters and processing the same; and a decoding-completed data storing step (S40) of storing, by each of the N number of clusters, the decoding-completed data in the frame memory.

The operation method of FIG. 5 will now be described in detail with reference to FIG. 6.

In FIG. 6, it is assumed that the video decoding apparatus receives a bit stream having a size of D1 (720*480 pixels) and including 40×35 number of MBs, includes six data memories 421 to 426, six clusters 431 to 436, and six cluster shared memories 441 to 446, and each of the six clusters 431 to 436 includes four resources 511 to 514 and three resource shared memories 521 to 523, however, the present invention is not limited thereto.

First, the variable length decoding unit 410 performs variable length decoding and parsing on the bit stream to restore residual data having a variable length and acquire a parameter required for a decoding operation. The variable length decoding unit 410 splits the data by row and parallel-stores the split data in the six data memories 421 to 426 (S11 to S16).

Then, the first cluster 431 reads an X coordinate included in the MB processing information stored in the sixth cluster shared memory 446 shared by the first cluster 431 and its upper cluster 436 to check whether or not the upper cluster 436 has completed decoding on the neighboring MBs of a current MB. If the upper cluster 436 has completed decoding on the neighboring MBs of the current MB and stores X coordinates of them, the first cluster 431 determines that the intra-screen data dependency is satisfied and reads the residual data and decoding parameter stored in the first data memory 421 and the decoded information included in the MB processing information stored in the sixth cluster shared memory 446 by row (S21-1 and S21-2).

Subsequently, the first cluster 431 splits dequantization and inverse discrete cosine transform (IDCT), motion vector prediction, intra prediction and motion compensation, video restoration, and deblocking function into four functions through the first to fourth resources 511 to 515 to and parallel-process them. Namely, the first cluster 431 performs the dequantization and inverse discrete cosine transform (IDCT) by using the residual data and the decoding parameter and the information stored in the MB processing information stored in the sixth cluster shared memory 446 and stores the performing result in the first resource shared memory 521 through the first resource 511 (S31), reads the result of the dequantization and inverse discrete cosine transform (IDCT) operation (32-1), performs a motion vector prediction operation, and stores the performance result in the second resource shared memory 522 through the second resource 512 (S32-2), reads the result of the motion vector prediction operation (S33-1), performs intra prediction, motion compensation, and a video restoration operation and stores the performance result in the second resource shared memory 523 through the third resource 513 (S33-2), reads the result of the intra prediction, motion compensation, and video restoration operation (S34), performs a deblocking operation, and stores the performance result in the frame memory 450 through the fourth resource 514 (S411).

In this case, in order to maximize the parallel characteristics and utilization of the decoding operation, preferably, the first to fourth resources 511 to 514 process a next MB immediately when a current MB is completely processed.

Subsequently, the first cluster 431 collects its MB processing information through the first to fourth resources 511 to 514 and stores the same in the cluster shared memory 442 shared between the first cluster 431 and the second cluster 432 (S21-3), so that the lower cluster, namely, the second cluster 432 can check an intra-data dependency with respect to a next row by using the MB processing information of the first cluster 431 and perform a decoding operation.

The other remaining clusters 432 to 436 also acquire the residual data and the decoding parameter and the MB processing information of the upper cluster by row in the same manner as that of the first cluster 431, and parallel-process the information acquired by row with four split functions.

This operation is repeatedly performed until such time as there no remaining bit stream to be decided (namely, until such time as it becomes null), and when there is no more bit stream to be decoded, the operation is terminated.

As set forth above, in the multi-format video decoding apparatus and method according to exemplary embodiments of the invention, a bit stream is split by row through N number of clusters so as to be processed, and each of the N number of clusters split a decoding function into M number of decoding functions through M number of resources so as to be processed. Also, information for canceling off intra-screen data dependency is provided through a resource shared memory supporting data communication between resources and a cluster shared memory supporting data communication between clusters.

Thus, because a bit stream is split into data units, which are then split into function units so as to be processed, regardless of a data dependency, the parallel characteristics and utilization of the decoding operation can be maximized.

Also, information required for the parallel operation is delivered to the resource shared memory and the cluster shared memory to prevent an increase in communication overhead due to the parallel operation in advance. As a result, the video decoding system can be stably implemented with limited communication resources.

In addition, because the number of data memories, clusters, cluster shared memories, resources, and resource shared memories are variably adjusted depending on the decoding size and performance of video, a high expandability and generality can be achieved.

While the present invention has been shown and described in connection with the exemplary embodiments, it will be apparent to those skilled in the art that modifications and variations can be made without departing from the spirit and scope of the invention as defined by the appended claims.

What is claimed is:

1. A video decoding apparatus using a data and function splitting scheme, the apparatus comprising:
   a variable length decoding unit configured to perform variable length decoding and parsing on a bit stream of the video to acquire residual data and a decoding parameter, and to split the residual data and the decoding parameter by row;
   N number of clusters arranged in a unidirectional loop, each cluster having a corresponding shared memory that receives an output only from said each cluster for exclusive use by one of the clusters immediately downstream from said each cluster, each cluster having M number of resources; and
   N number of data memories supporting data communication between the variable length decoding unit and the N number of clusters, wherein
   each cluster splits a decoding function into the M number of functions to be respectively processed by the M number of resources, acquires a row of the residual data and the decoding parameter from the variable length decoding unit, acquires macroblock (MB) processing information from a corresponding shared memory of one of the clusters immediately upstream from said each cluster, and splits the acquired residual data, decoding parameter and MB processing information to thereby process the same using the M number of resources;
   each cluster further includes (M−1) number of resource shared memories, each being exclusively shared by neighboring two of the M number of resources, to thereby support inter-resource data communication between the neighboring two resources; and
   N and M are natural numbers larger than 1.

2. The apparatus of claim 1, wherein
   the M number of functions include dequantization and inverse discrete cosine transform (IDCT), motion vector prediction, intra prediction and motion compensation, video restoration, and deblocking function.

3. The apparatus of claim 1, wherein the MB processing information of the immediately upstream cluster comprises X coordinate and decoded information of decoded MBs decoded by the immediately upstream cluster.

4. The apparatus of claim 3, wherein each of the N number of clusters has a function of checking inter-data dependency through the X coordinate and waiting for an operation until such time as inter-data dependency is satisfied.

5. The apparatus of claim 1, wherein M and N are determined in consideration of a decoding size and performance of a subject video.

6. The apparatus of claim 1, further comprising:
a frame memory storing decoded data received from each of the N number of clusters.

7. The apparatus of claim 1, wherein each of the resources is a hardware IP (Intellectual Property) or a processor core.

8. A video decoding method, based on a data and function splitting scheme using a variable length decoding unit, N number of clusters arranged in a unidirectional loop, N number of data memories supporting data communication between the variable length decoding unit and the N number of clusters, each cluster including M number of resources, a corresponding shared memory that receives an output only from said each cluster for exclusive use by one of the clusters immediately downstream from said each cluster, and (M−1) number of resource shared memories that is each exclusively shared by neighboring two of the M number of resources, N and M being natural numbers larger than 1, the method comprising:
performing variable length decoding and parsing on a bit stream of the video to acquire residual data and a decoding parameter from a bit stream, and splitting the residual data and the decoding parameter by row;
acquiring, by each of the N number of clusters, the residual data and the decoding parameter, and macroblock (MB) processing information from the corresponding shared memory of one of the clusters immediately upstream from said each cluster;
splitting, by said each of the N number of clusters, a decoding operation into M number of functions to be respectively processed by the M number of resources, splitting the acquired residual data, decoding parameter and MB processing information, and parallel-processing the same using the M number of resources; and
supporting, for said each of the N number of clusters, inter-resource data communication between neighboring two of the M number of resources in said each cluster using the (M−1) number of resource shared memories thereof.

9. The method of claim 8, wherein the MB processing information of the immediately upstream cluster comprises an X coordinate and decoded information of MBs decoded by the immediately upstream cluster.

10. The method of claim 9, wherein the acquiring of the residual data and decoding parameter by row comprises:
checking, by said each of the N number of clusters, an intra-data dependency through the X coordinate included in the MB processing information stored in the corresponding shared memory of the immediately upstream cluster;
when the intra-data dependency is satisfied, acquiring, by said each of the N number of clusters, the residual data and the decoding parameter stored in a data memory connected to said each cluster by row; and
acquiring, by said each of the N number of clusters, the decoded information included in the MB processing information stored in the corresponding shared memory of the immediately upstream cluster.

11. The method of claim 8, wherein the splitting the decoding operation into M number of functions and parallel-processing the same comprises:
splitting, by said each of the N number of clusters, the decoding operation with respect to the residual data, the decoding parameter, and the MB processing information of the immediately upstream cluster through the M number of resources;
collecting, by said each of the N number of clusters, the MB processing information through the M number of resources and storing the collected MB processing information in the corresponding shared memory of said each cluster; and
when the decoding operation of each of the N number of clusters is completed, collecting decoding-completed data through the M number of resources and delivering the collected decoding-completed data to a frame memory.

* * * * *